United States Patent
Arimilli et al.

(10) Patent No.: US 8,281,075 B2
(45) Date of Patent: Oct. 2, 2012

(54) PROCESSOR SYSTEM AND METHODS OF TRIGGERING A BLOCK MOVE USING A SYSTEM BUS WRITE COMMAND INITIATED BY USER CODE

(75) Inventors: Lakshminarayana Baba Arimilli, Austin, TX (US); Brian Mitchell Bass, Apex, NC (US); David Wayne Cummings, Round Rock, TX (US); Bernard Charles Drerup, Austin, TX (US); Guy Lynn Guthrie, Austin, TX (US); Ronald Nick Kalla, Round Rock, TX (US); Hugh Shen, Round Rock, TX (US); Michael Steven Siegel, Raleigh, NC (US); William John Starke, Round Rock, TX (US); Derek Edward Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 643 days.

(21) Appl. No.: 12/423,355

(22) Filed: Apr. 14, 2009

(65) Prior Publication Data
US 2010/0262735 A1    Oct. 14, 2010

(51) Int. Cl.
*G06F 13/00* (2006.01)
*G06F 13/36* (2006.01)
*G06F 13/38* (2006.01)
*G06F 9/315* (2006.01)

(52) U.S. Cl. ........ 711/126; 711/163; 711/165; 710/110; 712/225

(58) Field of Classification Search ............. 711/126, 711/163, 165; 710/110; 712/225
See application file for complete search history.

(56) References Cited

U.S. PATENT DOCUMENTS

| | | | |
|---|---|---|---|
| 5,125,095 A | 6/1992 | Nakazawa | |
| 5,909,698 A * | 6/1999 | Arimilli et al. | 711/145 |
| 5,983,338 A | 11/1999 | Moyer | |
| 6,178,484 B1 * | 1/2001 | Arimilli et al. | 711/145 |
| 6,247,113 B1 | 6/2001 | Jaggar | |
| 2006/0224831 A1 * | 10/2006 | Yoshikawa | 711/137 |
| 2008/0126602 A1 * | 5/2008 | Biran et al. | 710/22 |

OTHER PUBLICATIONS

Bacon et al, "Braids and Fibers: Language Constructs with Architectural Support for Adaptive Responses to Memory Latencies," IBM Jour. Res. & Dev., vol. 50, No. 2/3, Mar./May 2006, pp. 1-12.*

* cited by examiner

*Primary Examiner* — Sanjiv Shah
*Assistant Examiner* — Glenn Gossage
(74) *Attorney, Agent, or Firm* — Yudell Isidore Ng Russell PLLC

(57) ABSTRACT

A technique for triggering a system bus write command with user code includes identifying a specific store-type instruction in a user instruction sequence. The specific store-type instruction is converted into a specific request-type command, which is configured to include core permission controls (that are stored in core configuration registers of a processor core by a trusted kernel) and user created data (stored in a cache memory). Slave devices are configured through register space (that is only accessible by the trusted kernel) with respective slave permission controls. The specific request-type command is then transmitted from the cache memory, via a system bus. In this case, the slave devices that receive the specific request-type command process the specific request-type command when the core permission controls are the same as the respective slave permission controls. The trusted kernel may be included in a hypervisor or an operating system.

20 Claims, 7 Drawing Sheets

US 8,281,075 B2

PROCESSOR SYSTEM AND METHODS OF TRIGGERING A BLOCK MOVE USING A SYSTEM BUS WRITE COMMAND INITIATED BY USER CODE

This invention was made with United States Government support under Agreement No. HR0011-07-9-0002 awarded by Defense Advanced Research Projects Agency (DARPA). The Government has certain rights in the invention.

BACKGROUND

1. Field

This disclosure relates generally to techniques that allow a user level instruction to initiate the movement of a block of data via a system bus write command and, more specifically, to techniques for performing a system bus write command while ensuring permission protections by an underlying operating system.

2. Related Art

In various applications, user programs (user code) may need to build data structures or packets in system memory to facilitate transmission of the data structures or packets out of the system memory to an input/output (I/O) device (e.g., a networked device) or a coprocessor. To transfer data from user code to an I/O device a conventional approach has: built a packet that includes data at location 'A' in a system memory; loaded the data from the location 'A' in the system memory into general purpose registers (GPRs) of a processor core; and stored the data in the GPRs to location 'B' in the system memory. In general, because a user program works in 'effective address' space, a processor core has been responsible for converting both address 'A' and address 'B' from effective addresses (used by software) to real addresses (used by hardware) and checking permissions to ensure that the user code (which may correspond to a thread) is allowed to access a page or pages of the system memory at the addresses 'A' and 'B'. By performing an effective-to-real address translation and a permission check, a hypervisor has controlled what real address space user code has been allowed to access. In the case where user code is attempting to send a relatively large amount of packets (to, for example, be transmitted over a network), the conventional approach can greatly limit the number of packets that can be built and transmitted in a given amount of time. Moreover, the conventional approach utilizes valuable bandwidth (in moving data through GPR registers of a processor core) that may be utilized by the processor core to perform other tasks.

SUMMARY

According to one aspect of the present disclosure, a technique for triggering a system bus write command with user code includes identifying a specific store-type instruction in a user instruction sequence. The specific store-type instruction is converted into a specific request-type command, which is configured (by hardware) to include core permission controls (that are stored in core configuration registers of a processor core) and user created data (stored in a cache memory). The specific request-type command is then transmitted from the cache memory, via a system bus. The core permission controls dictate whether slave devices receiving the specific request-type command (via the system bus) are able to process the specific request-type command.

According to another aspect of the present disclosure, a processor system includes a processor core, a cache memory coupled to the processor core and a system bus, and slave devices coupled to the system bus. The processor core and the cache memory are configured to identify a specific store-type instruction in a user instruction sequence and convert the specific store-type instruction into a specific request-type command. The specific request-type command is configured (by hardware included in the processor core and the cache memory) to include core permission controls (that are stored in core configuration registers of the processor core by a trusted kernel) and user created data (stored in the cache memory). The slave devices are configured through register space (that is only accessible by the trusted kernel) with respective slave permission controls. The cache memory is configured to transmit the specific request-type command via the system bus. In this case, the slave devices that receive the specific request-type command (via the system bus) process the specific request-type command when the core permission controls are the same as the respective slave permission controls.

BRIEF DESCRIPTION OF THE DRAWINGS

The present invention is illustrated by way of example and is not intended to be limited by the accompanying figures, in which like references indicate similar elements. Elements in the figures are illustrated for simplicity and clarity and have not necessarily been drawn to scale.

DETAILED DESCRIPTION

Figure 1:
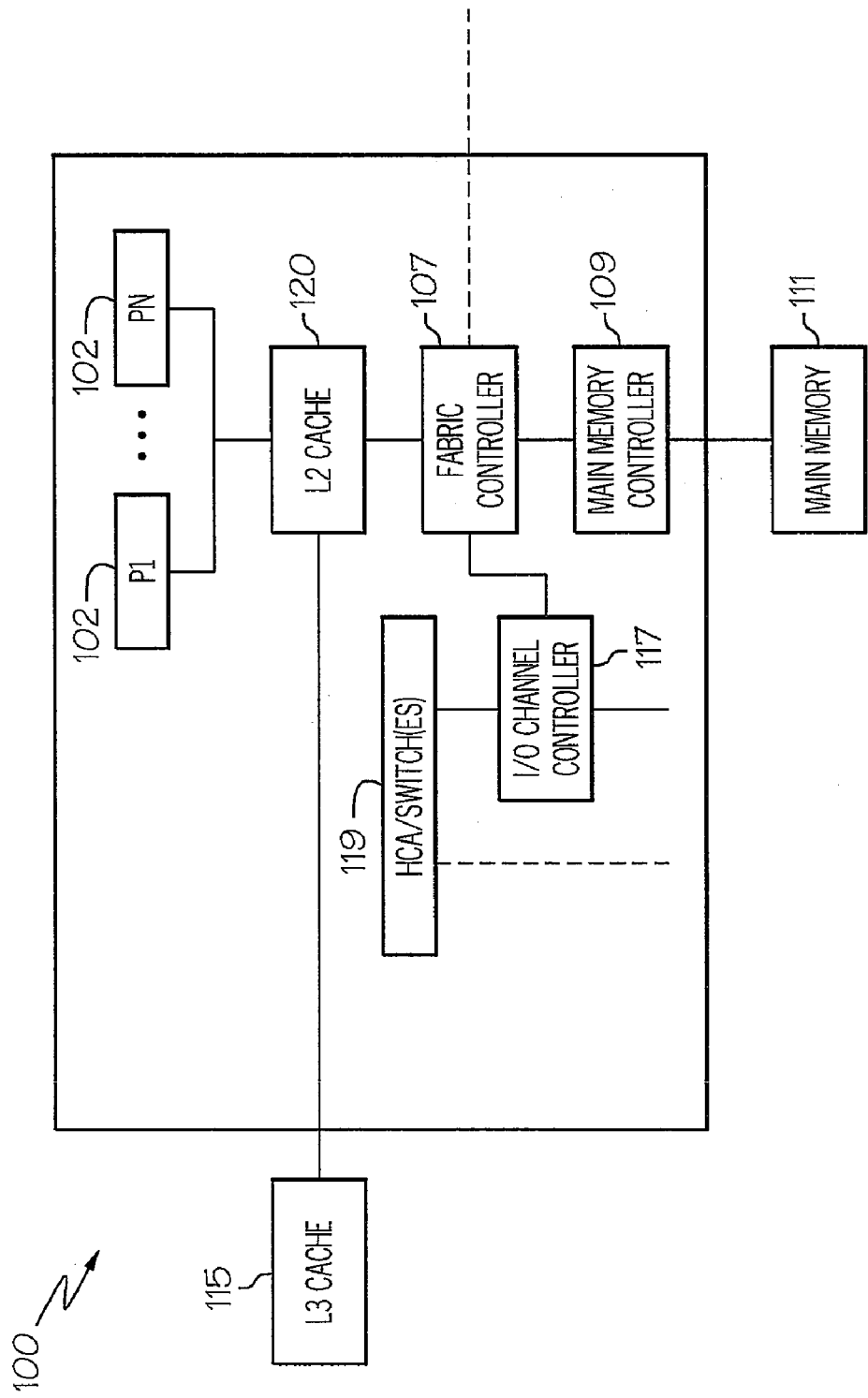
FIG. 1 is a diagram of a relevant portion of an example processor system that may be configured to implement a processor core and a level-2 (L2) cache memory (cache) according to an embodiment of the present disclosure.

As will be appreciated by one of ordinary skill in the art, the present invention may be embodied as a method, system, device, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." For example, the present invention may take the form of one or more design files included in a computer program product on a computer-usable storage medium having computer-usable program code embodied in the medium.

Any suitable computer-usable or computer-readable storage medium may be utilized. The computer-usable or computer-readable storage medium may be, for example, but is not limited to an electronic, magnetic, optical, electromagnetic, infrared, or semiconductor system, apparatus, or device. More specific examples (a non-exhaustive list) of the computer-readable storage medium include: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. The computer-usable or computer-readable storage medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this disclosure, a computer-usable or computer-readable storage medium may be any medium that stores a program for use by or in connection with an instruction execution system, apparatus, or device. As used herein, the term "coupled" includes both a direct electrical connection between blocks or components and an indirect electrical connection between blocks or components achieved using one or more intervening blocks or components.

To increase the efficiency for which a user program can send packets, a special store-type instruction (which triggers hardware to 'copy' (write) from real address 'A' to a real address 'B' while maintaining permission controls (set by a trusted kernel) to control real memory space that the user program is allowed to access) is disclosed. In this case, the real address 'B' corresponds to a slave device (e.g., a coprocessor, a host fabric interface (HFI), or an HFI that includes a network device, a coprocessor, etc.) that is initialized by a trusted kernel to have permission to accept commands from a user thread with a given permission key. According to this aspect of the present disclosure, a system bus protocol is implemented to enable a 'level-2' (L2) cache memory (cache) to send a command packet on behalf of the special store-type instruction and to implement flow control policies for the slave device to regulate the rate at which the commands are processed. While the discussion herein is directed to an L2 cache, it is contemplated that the techniques described herein can be implemented in a higher or lower level cache.

According to various aspects of the present disclosure, a data cache block enqueue (DCBQ) instruction (e.g., a 4-byte special store-type instruction) is implemented to allow user code to trigger a special system bus write command (i.e., a DCBQ request (DCBQ_Req) command). In a typical implementation, when initiated, the DCBQ_Req command is accepted by a system bus slave device (slave) that is authorized to accept DCBQ_Req commands from a given user thread. In at least one embodiment, a DCBQ_Req packet includes a full cache-line that is sent to the slave as part of the DCBQ_Req command. In one or more embodiments, a DCBQ_Req packet includes: a 'permission key' field (created by, for example, hardware and a trusted kernel to facilitate permission control); a 'memory management' field that conveys information for the slave in the event a cache-line payload contains effective addresses (EAs) that need to be converted to real addresses (RAs); a DCBQ transfer type (ttype) field that indicates (to the slave) a DCBQ_Req operation; and a data payload field (which is, for example, user defined).

A DCBQ_Req command can be used in various manners. For example, a DCBQ_Req command may correspond to a coprocessor packet that includes a control block of information that a processor sends to a coprocessor for processing (e.g., moving a block of data that starts at address 'A' in system memory to start at address 'B' in the system memory) or the DCBQ_Req command may correspond to a network packet that includes a network routing header and a payload (Spec$_{13}$ Info) that is to be transmitted across a network connection. In general, implementation of a DCBQ instruction allows user code to efficiently perform an 'atomic cache-line copy' from a real address (RA) 'A' to an RA 'B' with a single store-type instruction. Typically, implementation of the DCBQ instruction decreases latency and overhead associated with transferring a packet and also increases the number of packets that can be built and transmitted in a given amount of time.

According to various embodiments of the present disclosure, a core and a level-2 (L2) cache are designed to include hardware that processes a user level DCBQ instruction and builds a DCBQ_Req packet. In at least one embodiment, the hardware builds four parts of a DCBQ_Req packet for a DCBQ_Req command. For example, a data flow mechanism can be built on top of an existing store queue buffer and L2 cache machine data flow plumbing to efficiently handle operations associated with building packets. In this manner, user code can efficiently transfer packets to a slave. The packets can then be used as network packets or as control blocks that can be interpreted by a slave to execute specific desired tasks. A 'permission key' may, for example, be set-up by a trusted kernel (e.g., a hypervisor) and stored in a core on a per-thread basis.

In one or more embodiments, the trusted kernel sets up the permission key for both a user thread initiating a DCBQ instruction and a slave that is designated to receive DCBQ_Req commands from the user thread. In this manner, the trusted kernel ensures that a user-initiated DCBQ instruction is only accepted by slaves to which the trusted kernel has granted permission. A DCBQ_Req transfer type (ttype) may be, for example, set-up by user code in a cache-line as part of initiating a DCBQ instruction. A payload of the cache-line may be, for example, set-up prior to user code initiating a DCBQ instruction and, in this case, the payload is defined by the user code to be interpreted by a given slave. As noted above, the payload may take various forms (e.g., network packets for a network device to forward out on a communication network, or control blocks for a coprocessor or direct memory access (DMA) engine) and include one or more cache-lines.

A DCBQ instruction may be configured such that user code provides status information back to a core. For example, the DCBQ instruction may cause user code to provide status information that includes: device 'accepted' command; device 'busy'; or device 'rejected' command. When the DCBQ instruction is configured to provide status via user code, a user can build a low-level form of flow control in sending of DCBQ_Req commands. However, it should be appreciated that configuring a DCBQ instruction to cause user code to provide status information to a core results in reduced core performance, since the completion of a DCBQ instruction is tied to completion of the DCBQ instruction on a system bus. A DCBQ instruction may also be configured to not provide status, via user code, to the core or to provide status to a memory address defined in a DCBQ_Req command. In this case, a stream of DCBQ instructions can be initiated in parallel by an L2 cache to maximize bandwidth for a stream of DCBQ instructions. For example, when a DCBQ instruction is configured to not provide status directly back to a core, user code can set-up a high-level form of flow control with a target device (e.g., a software push/pop counter that is maintained via reading of a target device 'pop' counter) or rely on system bus 'retry' flow control by a slave device.

According to various aspects of the present disclosure, a system bus protocol for a user level DCBQ instruction is disclosed that facilitates sending data packets to a functional unit (e.g., an HFI including one or more coprocessors and/or one or more network devices). In general, the system bus protocol facilitates sending (e.g., by an L2 cache) a DCBQ_Req packet on behalf of the DCBQ instruction, as well as setting flow control policies for a slave to regulate a rate at which DCBQ_Req commands are processed. According to another aspect of the present disclosure, permission policies and a flow control protocol for a user level DCBQ instruction are disclosed that facilitate sending of data packets to a coprocessor and/or a network device. The permission mechanism, which may be controlled and set-up by a trusted kernel, enables the DCBQ instruction to be a user level instruction. In various embodiments, the trusted kernel is configured to ensure that the user code can only access system bus slaves for which permission was previously set-up by the trusted kernel. In this case, the user code cannot access resources for which the user code has not previously been granted access permission by the trusted kernel.

With reference to FIG. 1, a relevant portion of an example processor system 100 is illustrated that may handle I/O operations according to one or more of the techniques disclosed herein. The example processor system 100 includes one or more chip-level multiprocessors (CMPs) only one of which is illustrated in FIG. 1, each of which may include multiple (e.g., two to one-hundred processor cores) processors 102. The CMP may correspond to, for example, a processor node of a computer cluster employed in a high performance computing (HPC) application. The processors 102 may, for example, operate in a simultaneous multithreading (SMT) mode or a single thread (ST) mode. When the processors 102 operate in the SMT mode, the processors 102 may employ multiple separate instruction fetch address registers to store program counters for multiple threads. In at least one embodiment, the processors 102 each include a first level (L1) cache memory (not separately shown in FIG. 1) that is coupled to a shared second level (L2) cache memory (cache) 120, which is coupled to a shared third level (L3) cache 115 and a fabric controller 107.

As is illustrated, the fabric controller 107 is coupled to a main memory controller (e.g., included in a Northbridge) 109, which is coupled to a memory subsystem (main memory) 111. The memory subsystem 111 includes an application appropriate amount of volatile and non-volatile memory. The fabric controller 107 facilitates communication between different CMPs and between the processors 102 and the memory subsystem 111 and, in this manner, functions as an interface. It should be appreciated that the various techniques disclosed herein are equally applicable to systems that employ separate L2 caches for each processor, as well as systems that employ separate L2 and L3 caches for each processor. Each of the L1, L2, and L3 caches may be combined instruction and data caches or data caches.

As is shown in FIG. 1, the fabric controller 107 is also coupled to an I/O channel controller (e.g., included in a Southbridge) 117, which is coupled to a host channel adapter (HCA)/switch block 119. The HCA/switch block 119 includes an HCA and one or more switches that may be utilized to couple the processors 102 of the CMP to other nodes (e.g., I/O subsystem nodes and other processor nodes) of a computer cluster.

Figure 1A:
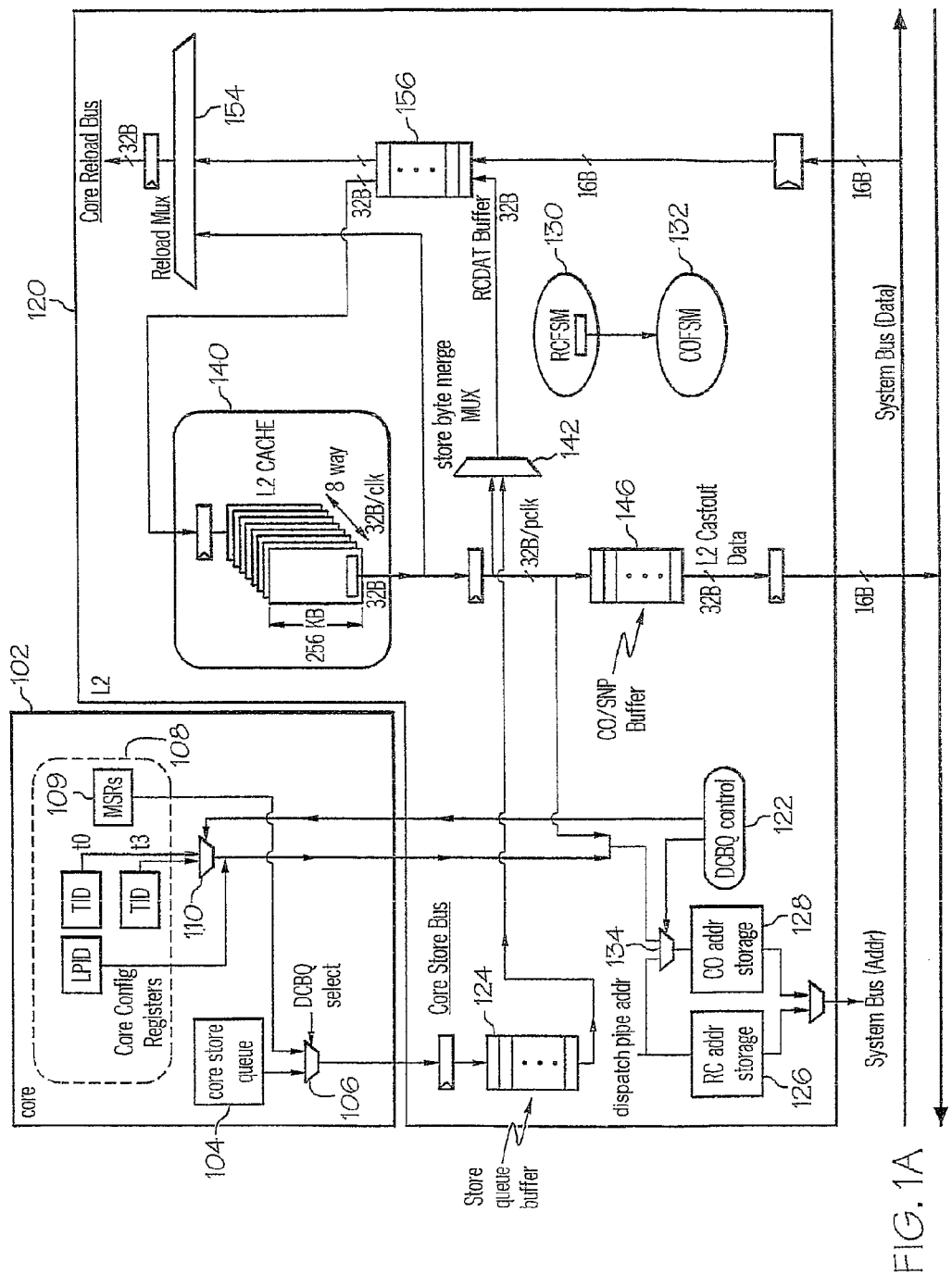
FIG. 1A is a block diagram depicting an example processor core and an example L2 cache configured according to an embodiment of the present disclosure.

With reference to FIG. 1A, data may flow into and out of the L2 cache 120 (configured according to various embodiments of the present disclosure) along a number of different paths. As is shown, the L2 cache 120 includes a 'core store bus', a 'core reload bus', and is coupled to a 'system bus', among other buses (not specifically shown). The core store bus is used to send stores (performed by an associated core 102 to an associated store-through 'level-1' (L1) cache) to the L2 cache 120. The core reload bus is used to deliver reload data to the core 102 for core load requests, along with any invalidates the L2 cache 120 needs to send to manage L1 caches (not shown in FIG. 1) in the core 102. The system bus is utilized by the L2 cache 120 to receive/move data from/to other caches or main memory. The L2 cache 120 includes (among other components): a store queue buffer 124; a store byte merge multiplexer 142; a read-claim data (RCDAT) buffer 156; a reload multiplexer 154; an L2 cache array 140; a cast-out/snoop (CO/SNP) buffer 146; a read-claim finite state machine (RCFSM) 130; and a cast-out finite state machine (COFSM) 132.

The store queue buffer 124 captures store-through data from the core 102. In at least one embodiment, the buffer 124 includes 8-32 byte (B) sectors, each of which can gather stores to a same physical thirty-two byte (32B) address region. In at least one embodiment, up to four sectors can 'cluster' when they are in the same 128B cache-line region. In the disclosed embodiment, the multiplexer 142 is configured to merge L2 cache hit data with store data provided by the store queue buffer 124. The RCDAT buffer 156 is configured to selectively capture L2 cache hit data, system bus input data, etc. For loads, the RCDAT buffer 156 collects L2 cache hit data for redelivery of the L2 cache hit data to the core reload bus. For stores, the RCDAT buffer 156 collects the store data provided by the store queue buffer 124 and merges in L2 cache hit data. The reload multiplexer 154 multiplexes L2 cache hit data and data from the RCDAT buffer 156 that is being returned to the core 102, via the core reload bus.

The CO/SNP buffer 146 captures reads of the L2 cache array 140 on behalf of the COFSM 132 and snoop (SNP) finite state machines (not shown) for subsequent delivery of the data to the system bus. The RCDAT buffer 156 captures incoming data to the L2 cache 120 based on requests made by the RCFSM 130. For stores, the buffer 156 also manages the merging of store data with a cache-line of data from the L2 cache array 140 or the system bus. The buffer 156 is then used to source data to the core 102 (via the core reload bus) and to the L2 cache array 140 (to complete the installation of a cache-line into the L2 cache array 140). The L2 cache array 140, which includes a directory and a data array, may be, for example, a 256B 8-way set associative cache structure. The directory holds a status and tag for each cache-line that is valid in the L2 cache array 140.

A read-claim address storage (RC addr storage) 126 and a cast-out address storage (CO addr storage) 128 are coupled (via a multiplexer) to address lines of the system bus. A multiplexer 134 is controlled by DCBQ control logic 122 to provide a dispatch pipe address or a combination of a logical partition identifier (LPID), a thread identifier (TID), a DCBQ control type (CT), a function request code (FRC), and a window identifier (WIND_ID) as an address for a DCBQ_Req command to an input of the cast-out address storage 128. The DCBQ control logic 122 also controls a multiplexer 110 (included in the core 102) to select an appropriate TID. The core 102 controls a DCBQ select multiplexer 106 to select associated memory management unit (MMU) information from memory management configuration registers (MSRs) 109 included in the core configuration registers (Core Config Registers) 108 of the core 102 to insert the information into 'byte 0' of a DCBQ instruction.

When the core 102 issues a DCBQ instruction, the multiplexer 106 is controlled by the core 102 to multiplex MMU bits over 'byte 0' of the DCBQ instruction. Byte 0 of the DCBQ instruction then corresponds to internal core configuration register information that is set-up by a trusted kernel.

Bytes 1-3 of the DCBQ instruction are defined by user code as part of the DCBQ instruction. To convert the DCBQ instruction into a DCBQ_Req command on the system bus, the L2 cache 120 builds the address (addr), transfer type (ttype), and address extension (add_ext) fields for the DCBQ_Req command. The L2 cache 120 builds the DCBQ_Req command by extracting portions of a data packet along with additional configuration registers from the core (i.e., LPID and TID, which can only be modified by a trusted kernel). The RCSFM 130 treats the DCBQ instruction as a normal store in terms of gaining ownership of an associated cache-line and committing 4-bytes associated with a DCBQ instruction to a cache-line. Once, completed, the RCSFM 130 initiates the COFSM 132 to perform a DCBQ_Req command for the cache-line on which the RCSFM 130 is working.

To make the operation 'atomic', the RCSFM 130 protects the cache-line (associated with the DCBQ instruction) until the COSFM 132 completes the DCBQ_Req command on the system bus. The COFSM 132 loads the address the RCFSM 130 is working on and based on an indication that the address is associated with a DCBQ_Req command, the COSFM 132 requests that the cache-line be read from the L2 cache array 140 and routed to the CO/SNP buffer 146. While the cache-line is being routed and stored in the buffer 146, CO control logic in the COFSM 132 copies bytes 1-3 of the cache-line into the CO address storage 128 in a format that is designated for the DCBQ_Req command. At substantially the same time, the DCBQ control logic 122 extracts (from the core 102) the LPID and TID which are also loaded into the CO address storage 128.

When the DCBQ_Req command address information is loaded, the COFSM 132 issues a DCBQ_Req command on the system bus to a targeted slave (functional unit (FU)). When the DCBQ_Req command is accepted by the targeted FU, the cache-line of data payload is sent to the targeted FU and the COFSM 132 goes idle. When the RCFSM 130 detects that the COFSM 132 has sent the DCBQ_Req command and the data associated with the DCBQ_Req command, the RC goes idle and stops protecting the cache-line address associated with the DCBQ_Req command. While a COFSM has been described herein as building a DCBQ_Req command, it should be appreciated that a different finite state machine (FSM) or a dedicated FSM may be implemented to build a DCBQ_Req command.

Figure 2:
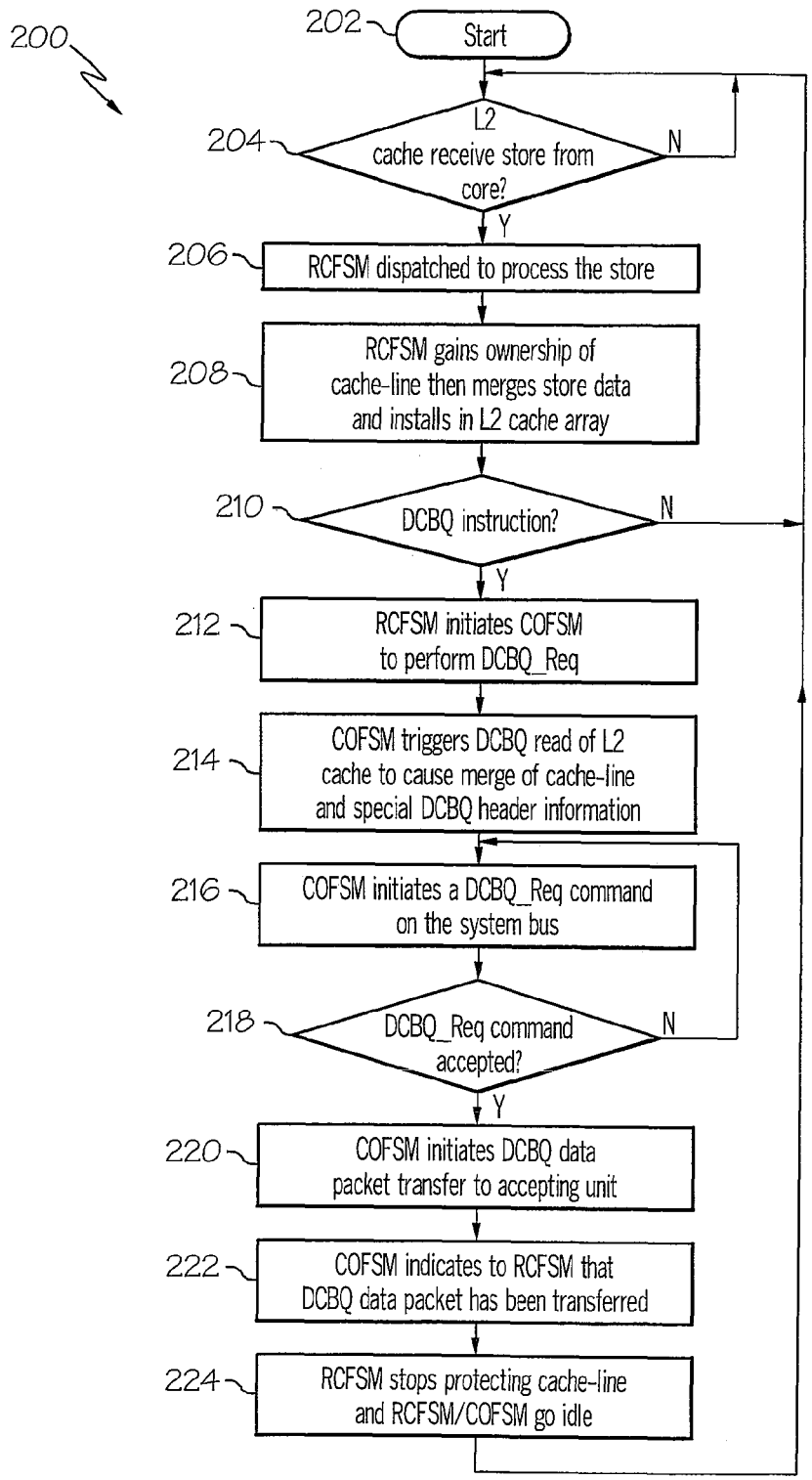
FIG. 2 is a flowchart of an example process depicting hardware flow for conversion of a data cache block enqueue (DCBQ) instruction to a DCBQ request (DCBQ_Req) command, according to an embodiment of the present disclosure.

With reference to FIG. 2, a process 200 for processing a DCBQ instruction, according to an embodiment of the present disclosure, is illustrated. In block 202, the process 200 is initiated. Next, in decision block 204, the L2 cache 120 determines whether a store-type instruction has been received from the core 102. When the L2 cache 120 does not receive a store-type instruction, control loops on block 204. In block 204, when the L2 cache 120 receives a store-type instruction, control transfers to block 206. In block 206, the RCFSM 130 is dispatched to process the store-type instruction. Next, in block 208, the RCFSM 130 gains ownership of a cache-line associated with the store-type instruction and merges store data into the cache-line and stores (or installs) the cache-line (with the merged store data) in the L2 cache array 140. Then, in decision block 210, the L2 cache 120 determines whether the store-type instruction is a DCBQ instruction (e.g., by examining an operational code for the store-type instruction). When the store-type instruction is not a DCBQ instruction, control transfers from block 210 to block 204. When the store-type instruction is a DCBQ instruction, control transfers from block 210 to block 212.

In block 212, the RCFSM 130 requests the COFSM 132 to initiate a DCBQ_Req command. Next, in block 214, the COFSM 132 triggers a read of an L2 cache-line (associated with the DCBQ instruction) to cause DCBQ header information to be merged into the cache-line. Then, in block 216, the COFSM 132 initiates a DCBQ_Req command on the system bus. Next, in decision block 218, the COFSM 132 determines whether the DCBQ_Req command was accepted by a designated target. If the DCBQ_Req command was not accepted in block 218, control transfers from block 218 to block 216. If the DCBQ_Req command was accepted in block 218, control transfers from block 218 to block 220. In block 220, the COFSM 132 initiates a DCBQ_Req data packet (payload) transfer to the designated target. Next, in block 222, the COFSM 132 provides an indication to the RCFSM 130 that the DCBQ data payload has been transferred. Then, in block 224, the RCFSM 130 stops protecting the cache-line and the RCFSM 130 and the COFSM 132 go idle until another DCBQ instruction is received or an other operation is initiated.

Figure 3:
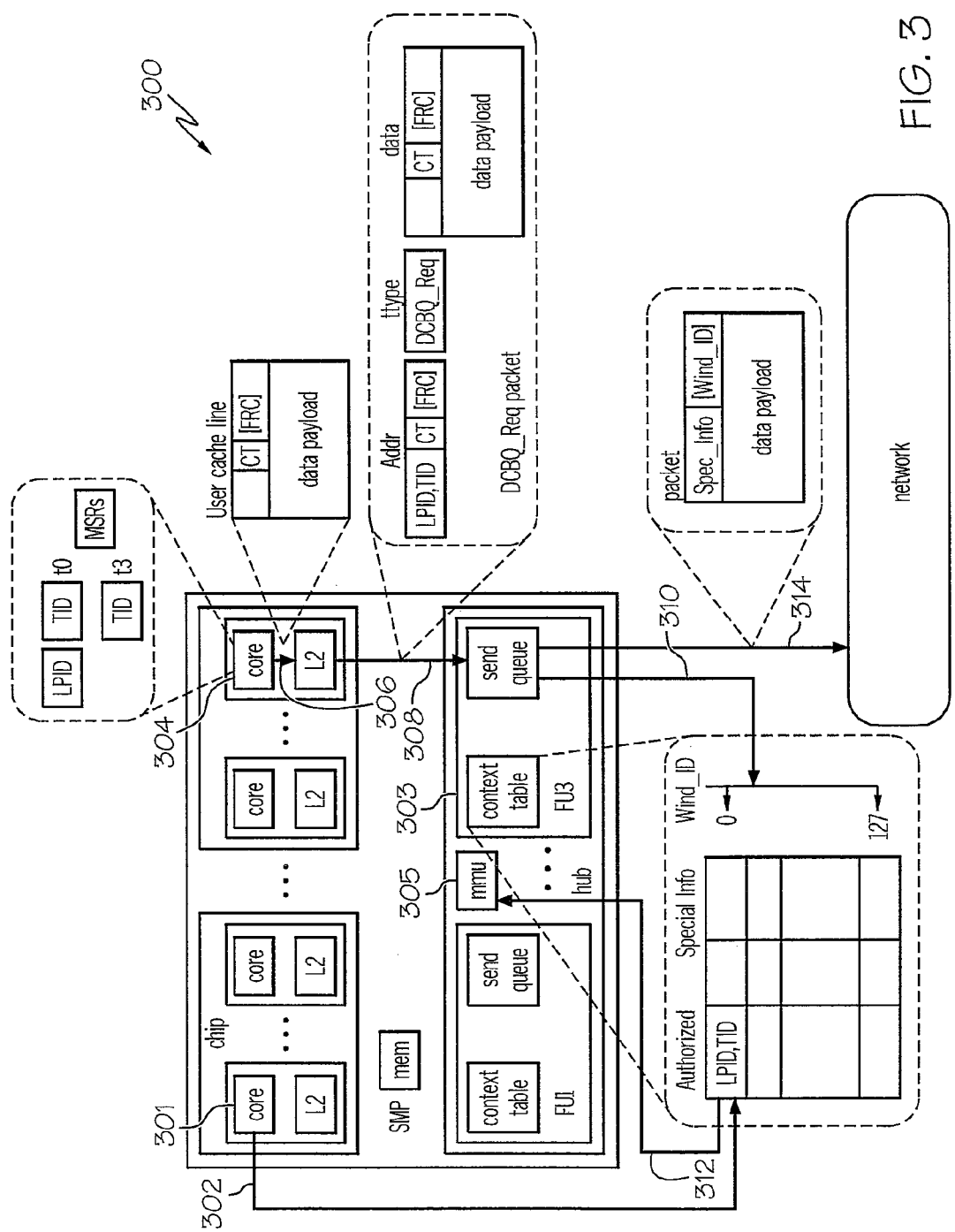
FIG. 3 is an example block diagram depicting conversion of a DCBQ instruction to a DCBQ_Req command that is provided to a functional unit (FU), according to an embodiment of the present disclosure.

With reference to FIG. 3, a flow 300 illustrates an example sequence for converting a DCBQ instruction to a DCBQ_Req command for communication between a thread of user code and a functional unit (FU), e.g., a host fabric interface (HFI) that forwards, sends, and receives packets from a network or a coprocessor. Initially, at 302, a trusted kernel (i.e., a hypervisor or an operating system (OS)), executing on core 301, performs a memory mapped input/output (MMIO) write to a context table (in an FU 303) to set-up authorization information for the user thread (which is executing one or more DCBQ instructions) in the FU 303. The trusted kernel configures the FU 303 to accept DCBQ_Req commands (from an L2 cache) associated with DCBQ instructions of the user thread. At 304, user code creates a message, for example, via normal stores into a cache-line (which is private user space for the user thread) for which the trusted kernel has previously set-up permissions. Then, in block 306, a helper thread (running on a same or a different processor core as the user thread) may be employed to build network packets or control blocks for multiple user threads.

Next, at 308, the L2 cache receives the DCBQ instruction which triggers the L2 cache to build a DCBQ_Req packet and send the packet to the FU 303 via the system bus. Then, at 310, the FU 303 reads and compares the LPID and TID with an appropriate entry in an associated context table, which was previously initialized by the trusted kernel (to ensure that the thread has permission to perform an operation associated with the command). According to one embodiment, the FU 303 utilizes a window identifier (Wind_ID) that is included in the DCBQ_Req packet to index into the associated context table to perform an authorization check on an associated context table entry (i.e., LPID/TID) to determine whether the thread is authorized. At 312, a memory management unit (MMU) 305 of the FU 303, if required (e.g., when the packet is a coprocessor packet), is utilized to convert EAs to an RAs.

The FU 303 extracts function request code (FRC) information from the DCBQ_Req command packet to determine a function type for a coprocessor that is to work on the data or a network device that is to build a network packet that is to be routed via a network to a designated receiving unit. At 314, the FU 303 sends a network packet over a network. When a receiving unit receives the network packet, the receiving unit compares the LPID and TID with entries in an associated context table (e.g., that was initialized by the trusted kernel) to ensure that the thread is permitted to perform designated operations. The receiving unit may also employ an MMU to perform EA to RA translation, if needed. When an FU includes a coprocessor, the coprocessor may be configured to interpret a received control block packet and execute an associated task on a data payload. In this case, the coprocessor then writes completion status as defined in control block packet.

Figure 4A:
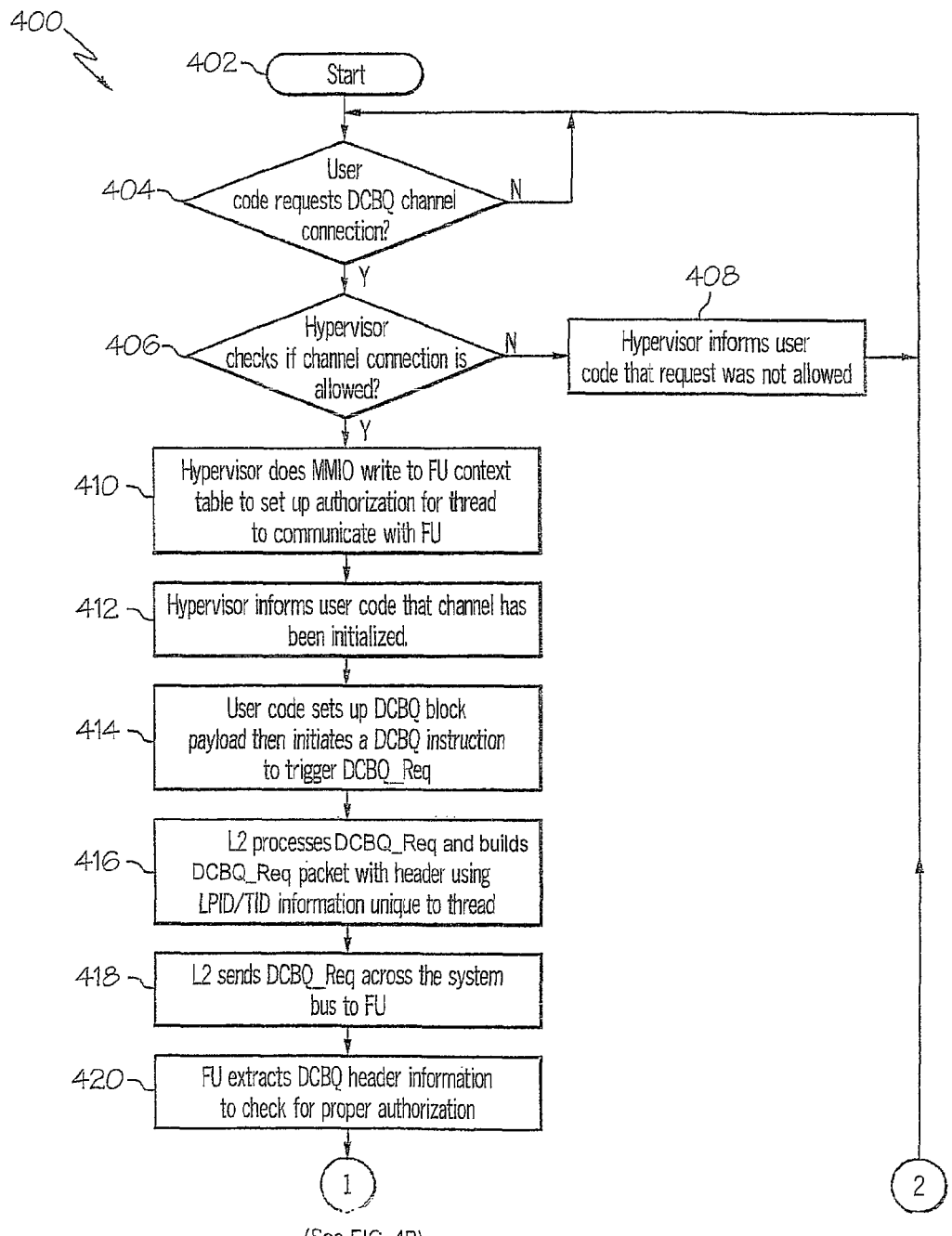
FIGS. 4A-4B are a flowchart of an example process depicting software flow for conversion of a DCBQ instruction to a DCBQ_Req command, according to an embodiment of the present disclosure.
Figure 4B:
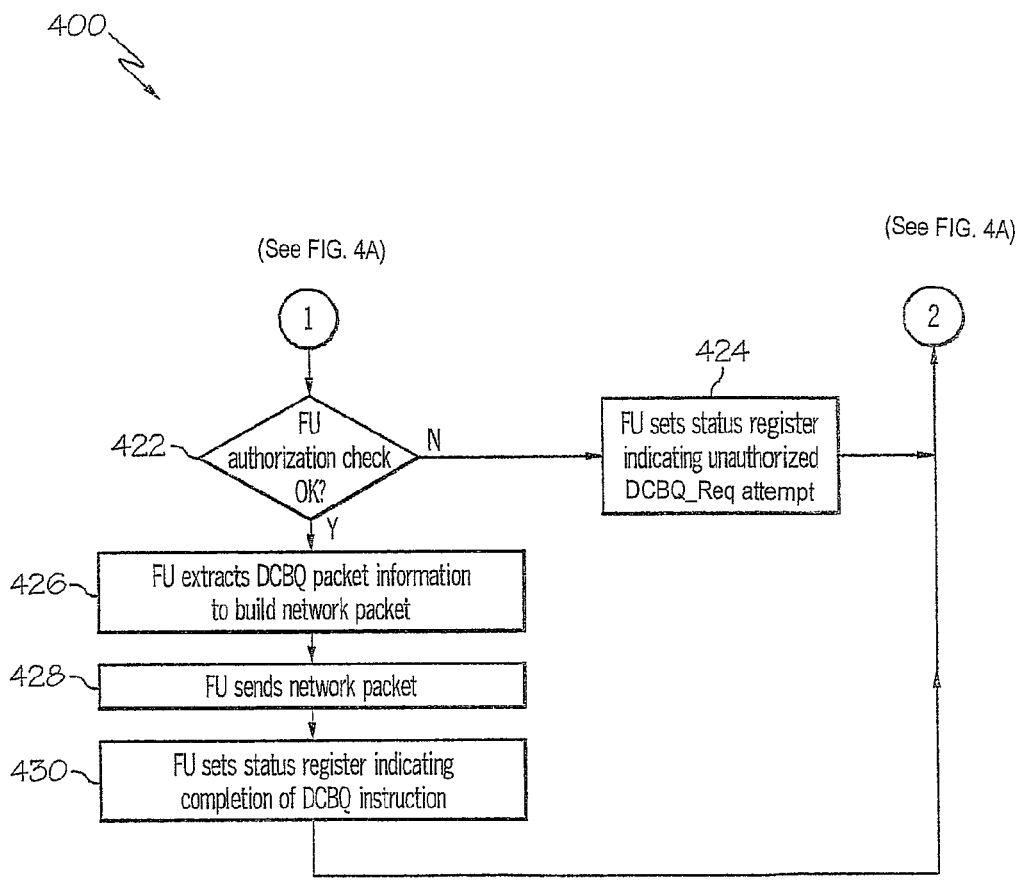

With reference to FIGS. 4A-4B, a process 400 for converting a DCBQ instruction to a DCBQ_Req command is illustrated. The process 400 is initiated at block 402, at which point control transfers to decision block 404. In block 404, it is determined whether user code requests a DCBQ channel connection (for an associated user thread) from a trusted kernel. If so, then in decision block 406, the trusted kernel (hypervisor) checks an internal table to ascertain whether the user thread is allowed a channel connection. If the channel connection is not allowed, control transfers from block 406 to block 408. In block 408, the trusted kernel informs the user code that the request for a channel connection is not allowed. If the channel connection is allowed, control transfers from block 406 to block 410. In block 410, the trusted kernel does a write (e.g., a memory mapped input/output (MMIO) write) to a context table of an appropriate FU to set-up authorization for the FU to communicate with the user thread. Next, in block 412, the trusted kernel informs the user code that the channel has been initialized.

Then, in block 414, the user code sets up a DCBQ block payload and then initiates a DCBQ instruction to trigger a DCBQ_Req. Next, in block 416, the L2 cache processes the DCBQ_Req and builds a DCBQ_Req packet with a header using LPID/TID information that is unique to the thread. Then, in block 418, the L2 cache sends the DCBQ_Req command across the system bus to the FU. Next, in block 420, the FU extracts the DCBQ header information to check for authorization. Then, in decision block 422 (see FIG. 4B), the FU determines whether the thread is authorized (i.e., the FU reads permissions in a context table to determine if an LPID/TID for the user thread was previously written to the context table by a trusted kernel). If the thread is not authorized to use the FU, control transfers from block 422 to block 424, where the FU sets a status register indicating an unauthorized DCBQ_Req attempt. If the thread is authorized to use the FU, control transfers from block 422 to block 426, where the FU extracts DCBQ information to build a network packet (or process a control block). Next, in block 428, when a network packet is indicated, the FU sends the network packet to a receiving unit, via a network. Then, in block 430, the FU sets a status register indicating completion of the DCBQ instruction. Following blocks 408, 424, and 430, control returns to block 404 while the process 400 is active.

Figure 5:
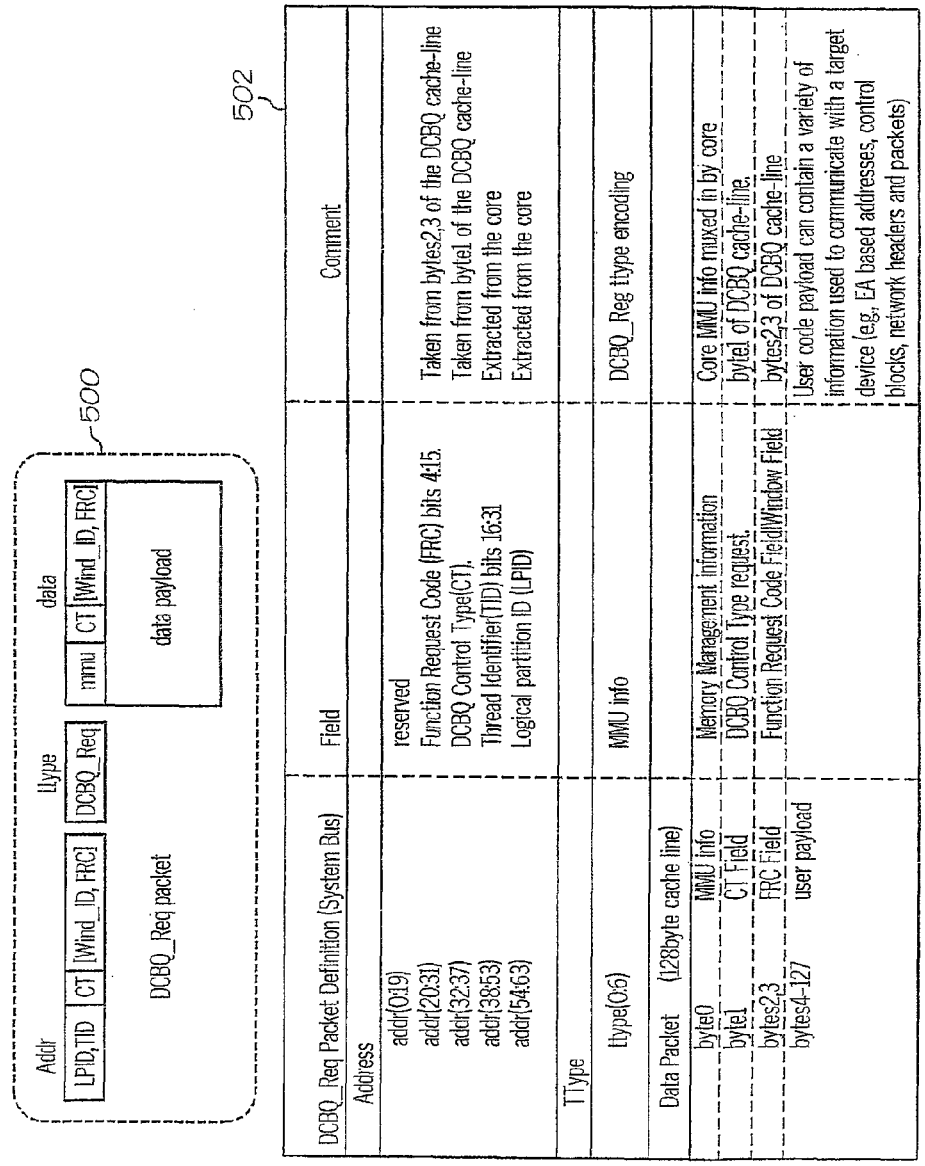
FIG. 5 is a diagram of an example format for a DCBQ_Req command packet.

With reference to FIG. 5, a format for a DCBQ_Req packet 500 and a format definition table 502, configured according to one embodiment of the present disclosure, are illustrated. As is shown, an address (Addr) for the DCBQ_Req packet includes: an LPID, a TID, a CT, a Wind_ID, and an FRC. In this embodiment, the FRC is taken from byte 2 and byte 3 of the DCBQ cache-line and the CT is taken from byte 1 of the DCBQ cache-line. The CT indicates a given FU and the FRC indicates which unit or function within the FU is to process the DCBQ_Req command. As noted above, the TID and the LPID (which are written to core configuration registers by a trusted kernel) are extracted from the registers. A ttype is set to a DCBQ_Req system bus encoding when a ttype of a store-type instruction corresponds to a DCBQ_Req ttype. A data packet for a DCBQ_Req command may include MMU information, a CT, a Wind_ID, an FRC, and a data payload. As noted above, the MMU information corresponds to core MSR information that is multiplexed into byte 0 of a DCBQ store by a core. As noted above, byte 0 of the DCBQ store is later merged with an associated DCBQ cache-line.

Accordingly, techniques have been disclosed herein that readily facilitate the triggering of a data block move using a system bus write command (initiated by user code) while maintaining permission controls.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method of triggering a system bus write command with user code, comprising:
   identifying a specific store-type instruction in a user instruction sequence;
   converting the specific store-type instruction into a specific request-type command, wherein the specific request-type command is configured by hardware to include core permission controls that are stored in core configuration registers of a processor core and user created data stored in a cache memory; and transmitting, from the cache memory, the specific request-type command via a system bus, wherein the core permission controls dictate whether slave devices receiving the specific request-type command via the system bus are able to process the specific request-type command.

2. The method of claim 1, further comprising:
writing, by a trusted kernel, the core permission controls to the core configuration registers.

3. The method of claim 2, further comprising:
writing, by the trusted kernel, slave permission controls to a context table of one of the slave devices.

4. The method of claim 3, further comprising:
receiving, by the one of the slave devices, the specific request-type command via the system bus; and
processing, by the one of the slave devices, the specific request-type command when the slave permission controls written to the context table of the one of the slave devices is the same as the core permission controls included in the specific request-type command.

5. The method of claim 1, wherein the specific request-type command has an associated data payload, and wherein the data payload corresponds to one or more network packets.

6. The method of claim 1, wherein the specific request-type command has an associated data payload, and wherein the data payload corresponds to control blocks.

7. The method of claim 1, wherein the transmitting further comprises:
transmitting, from the cache memory, a data payload associated with the specific request-type command via the system bus, wherein a cache-line associated with the specific request-type command is protected to ensure the cache-line is not modified until transfer of the associated data payload to one of the slave devices coupled to the system bus is complete.

8. A processor system, comprising:
a processor core;
a cache memory coupled to the processor core, wherein the processor system is configured to:
identify a specific store-type instruction in a user instruction sequence;
convert the specific store-type instruction into a specific request-type command, wherein the specific request-type command is configured to include core permission controls that are stored in core configuration registers of the processor core by a trusted kernel and user created data stored in the cache memory; and
transmit, from the cache memory, the specific request-type command via a system bus; and
slave devices coupled to the system bus, wherein the slave devices are configured through respective register space that is only accessible by the trusted kernel with respective slave permission controls, and wherein the slave devices process the specific request-type command only when the core permission controls are the same as the respective slave permission controls.

9. The processor system of claim 8, wherein the trusted kernel is included in a hypervisor.

10. The processor system of claim 9, wherein the trusted kernel is included in an operating system.

11. The processor system of claim 8, wherein the trusted kernel writes the respective slave permission controls to the slave devices using memory-mapped input/output writes.

12. The processor system of claim 8, wherein the specific request-type command has an associated data payload, and wherein the data payload corresponds to one or more network packets.

13. The processor system of claim 8, wherein the specific request-type command has an associated data payload, and wherein the data payload corresponds to control blocks.

14. The processor system of claim 8, wherein the cache memory is further configured to transmit a data payload associated with the specific request-type command via the system bus, and wherein a cache-line associated with the specific request-type command is protected to ensure the cache-line is not modified until transfer of the associated data payload to one of the slave devices is complete.

15. A method of triggering a system bus write command with user code, comprising:
identifying a specific store-type instruction in a user instruction sequence;
converting the specific store-type instruction into a specific request-type command, wherein the specific request-type command is configured by hardware to include core permission controls that are stored in core configuration registers of a processor core and user created data stored in a cache memory;
transmitting, from the cache memory, the specific request-type command via a system bus;
receiving, by a slave device coupled to the system bus, the specific request-type command; and
processing, by the slave device, the specific request-type command when slave permission controls stored in a context table of the slave device are the same as the core permission controls included in the specific request-type command.

16. The method of claim 15, further comprising:
writing, by a trusted kernel, the core permission controls to the core configuration registers.

17. The method of claim 16, further comprising:
writing, by the trusted kernel, the slave permission controls to the context table of the slave device.

18. The method of claim 15, wherein the specific request-type command has an associated data payload, and wherein the data payload corresponds to one or more network packets.

19. The method of claim 15, wherein the specific request-type command has an associated data payload, and wherein the data payload corresponds to control blocks.

20. The method of claim 15, wherein the transmitting further comprises:
transmitting, from the cache memory, a data payload associated with the specific request-type command via the system bus, wherein a cache-line associated with the specific request-type command is protected to ensure the cache-line is not modified until transfer of the associated data payload to the slave device is complete.

* * * * *